July 22, 1952 J. GRZYBOWSKI 2,604,127
ROTARY AND RECIPROCATING TOOL OPERATING MACHINE
Filed April 20, 1948 2 SHEETS—SHEET 1
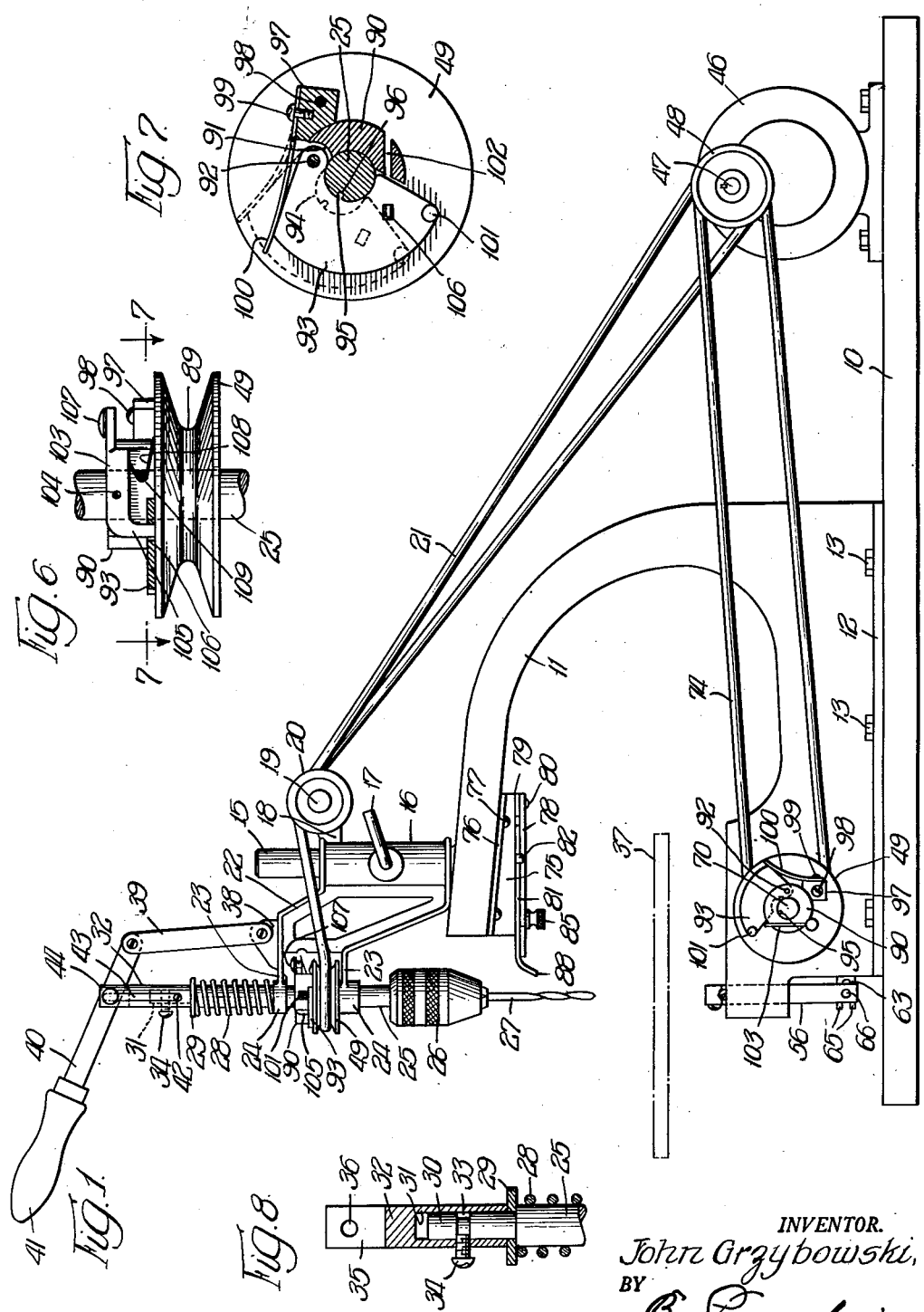
INVENTOR.
John Grzybowski,
BY

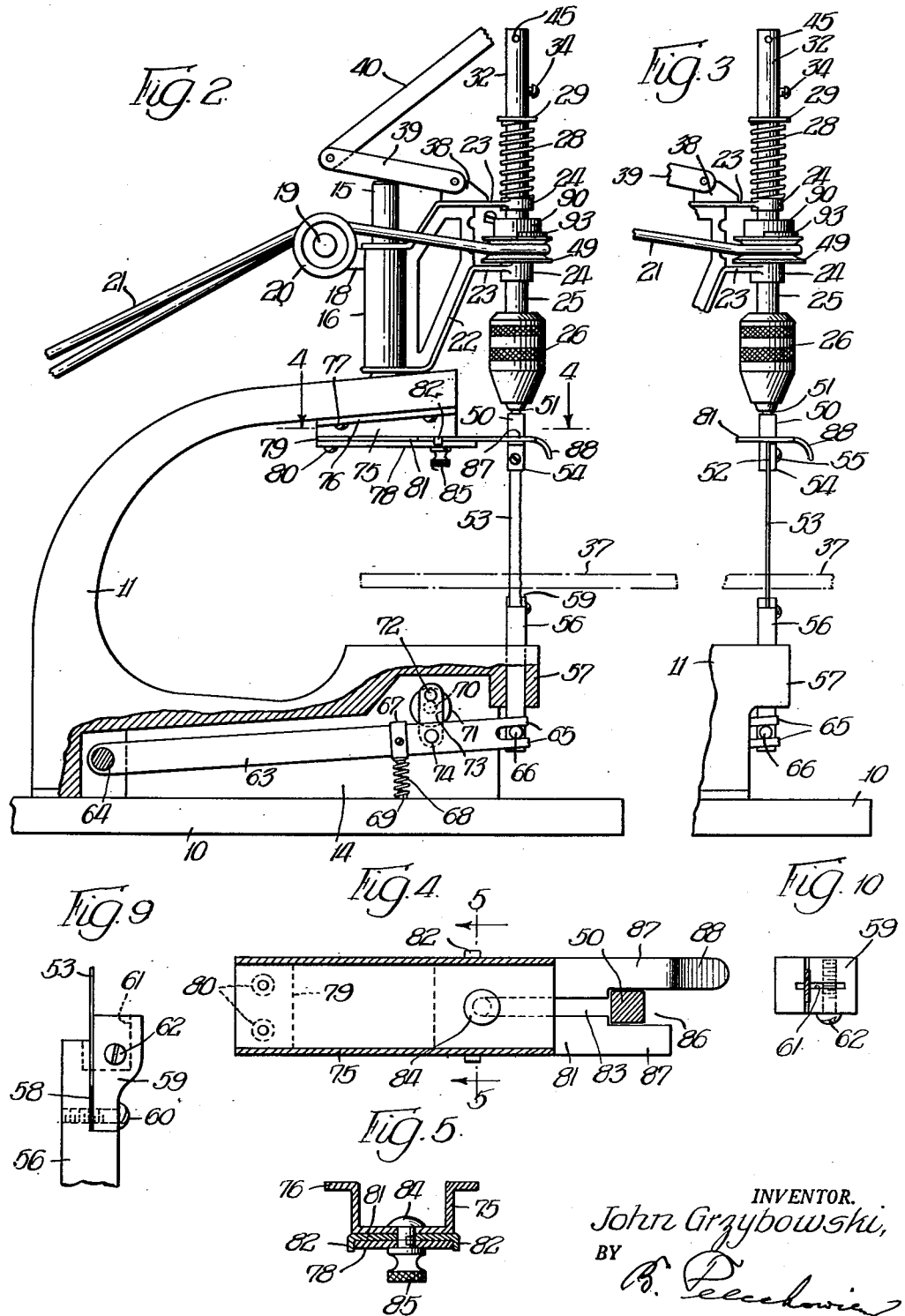

Patented July 22, 1952

2,604,127

UNITED STATES PATENT OFFICE 2,604,127

ROTARY AND RECIPROCATING TOOL OPERATING MACHINE

John Grzybowski, Chicago, Ill.

Application April 20, 1948, Serial No. 22,087

2 Claims. (Cl. 144—35)

The present invention relates to rotary and reciprocating tool operating machines, wherein the two tools may be interchangeably employed, and its main object is the provision of a mechanism for normally imparting a rotary movement to a drill or a like rotary tool, with means for rendering said mechanism inoperative and for hooking up into the machine of a reciprocating mechanism for operating a saw when the same had been substituted for a drill or a like tool.

A still further object of the present invention is to generally improve a drill operating machine convertible into a saw operating machine.

Another object of the present invention is the provision in a rotary tool supporting member of means for shifting said member in a vertical direction for driving a rotary tool toward the work, simultaneously permitting said member to make rotary movement with the tool.

A still further object of the present invention is the provision in a rotary tool supporting member and an engaging member associated therewith of a joint therebetween permitting longitudinal shifting movement of said supporting member when a pressure is applied to said engaging member, and which permits said supporting member to rotate independently of said engaging member.

Another object is the improving of a machine capable of interchangeably receiving rotary and reciprocating tools.

Another object of the present invention is the provision of an improved pulley which can be readily rigidly affixed to a shaft with which the same rotates, and which can readily be disconnected from the shaft so that the same may idle thereon when it is necessary to render the pulley inoperative.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application and in which like designating characters refer to corresponding parts throughout the several views;

Fig. 1 is a side elevational view of the present machine, with a drill in an operative association therewith;

Fig. 2 is a side elevational view of the present machine, partly in section, with a saw in an operative position therewith;

Fig. 3 is a similar view with the saw turned substantially to ninety degrees;

Fig. 4 is an enlarged cross-section view, on line 4—4 of Fig. 2;

Fig. 5 is a cross-sectional view on line 5—5 of Fig. 4;

Fig. 6 (sheet 1) is an enlarged edge elevational view, partly in section, of the pulley with the mechanism whereby the same may be rigidly connected with or disconnected from a driven shaft;

Fig. 7 is a side elevational view of the pulley, partly in cross-section;

Fig. 8 is a cross-section view, on a vertical plane, of a rod, though which rotary and upright shifting movement are imparted to the drill or like rotary tool;

Fig. 9 (sheet 2) is a fragmentary side elevational view of saw engaging means at one of its ends; and Fig. 10 is a top elevation view thereof.

Referring in detail to the present drawings there is shown base 10, supporting substantially U-shaped frame 11. The lower end of said frame 11 has laterally projecting wings 12, through which a plurality of screws 13 are driven into base 10 for rigidly supporting said frame thereon. The lower end of said frame 11 is provided with housing 14, within which a mechanism, hereinafter described, for reciprocating a saw, is located.

Rigidly supported upon the upper end of frame 11, and upwardly projecting therefrom, is post 15, upon which sleeve 16 is positioned for upward adjusting movement. A screw, having laterally directed handle 17, driven through said sleeve 16, engages said post 15, for maintaining said sleeve 16 in a rigid adjusted position upon said post 15.

Arm 18, rigidly formed with sleeve 16, projects rearwardly, and supports shaft 19, at each end of which an idler pulley 20 is positioned. The two idler pulleys 20 support two strands of endless cord 21.

Extending from said sleeve 16, forwardly of the machine, at point substantially diametrically opposite of arm 18, is a frame member 22, terminating at its free front end in a pair of arms 23, which are in a spaced relation on a vertical plane, and each of which at its front end is provided with an integrally formed collar 24. The two collars 24 support rod 25 for a vertical sliding movement. The lower end of said rod 25 carries chuck 26, which normally supports drill 27 or a like rotary tool.

Coil spring 28 encompasses rod 25 and is interposed between upper collar 24 and stop washer 29, the latter affixed to said rod 25 in a manner hereinafter described.

Rod 25 has the upper end reduced in diameter for defining head 30, which is receivable within bore 31 made in the lower end of cylindrical extension 32, which is of a diameter corresponding to that of rod 25. Washer 29 is inserted over said head 30 and positioned upon the resultant shoulder of rod 25, and is there maintained in a clamped position by the lower end of said extension 32. Said head 30 has a circumferential groove 33, within which the inner end of screw 34 is fitted, said screw 34 being driven through the wall of said extension 32, adjacent its lower end. By virtue of this arrangement rod 25 is capable of making rotary movement within extension 32, independently of the latter, and while the latter remains stationary. Through connection by screw 34 rod 25 and extension 32 are capable of simultaneous upright shifting movement.

The upper end of said extension 32 is bifurcated, defining recess 35, the two resulting leaves of said upper end of extension 32 have alined transverse apertures 36, for the purpose hereinafter stated.

The mechanism for manually shifting rod 25 and extension 32, and with them chuck 26 and tool 27, toward work 37, in a downward upright direction, includes tongue 38, rigidly formed with and upwardly projecting from upper arm 23 and frame member 22. Pivotally affixed to said tongue 38 by one of its ends is link arm 39, the other end of which is pivotally affixed to handle bar 40, the outer end of which carries handle 41.

Affixed to extension 32 by means of screw 42 is a resilient oblong arm 43, provided with a knob 44 at its upper end. Rigidly affixed to said upper end of arm 43, and disposed towards extension 32 is pin 45, Figs. 2 and 3, which normally enters apertures 36 made in the two leaves of the bifurcated end of extension 32. Handle bar 40 is provided with an aperture which remains in an alinement with apertures 36 when said handle bar 40 remains within recess 35 in the upper end of extension 32. Pin 45 will thus constitute a pivot upon which said handle bar 40 angularly shifts when supported within said bifurcated end of extension 32. Manual grasping of knob 44 and shifting the same away from extension 32 will shift pin 45 from apertures 36 and an alined aperture in handle bar 40, freeing the latter from its pivotal connection with extension 32 and rendering said handle bar 40 inoperative.

When said handle bar 40 is in a pivotal connection with extension 32, through pin 45, as aforesaid, manual pressure exerted upon handle 41, in a downward direction, will cause the downward shifting movement of extension 32 and rod 25, the latter within said collars 24, and against the tension of spring 28, compressing the latter for driving tool 27 toward work 37. The release of pressure on handle 41 automatically shifts extension 32 and rod 25 into an opposite direction, for driving tool 27 away from work 37, by virtue of the action of spring 28, which, bearing against the upper collar 24 and washer 29, drives said extension 32 and rod 25 in an upward direction.

Affixed to base 10 is motor 46, which rotates shaft 47. Keyed to said shaft 47 is a pair of pulleys 48, over one of which cord 21 is passed. The opposite termination of said cord 21 is passed over pulley 49 which is keyed to rod 25, and interposed between two collars 24. The construction of this pulley 49 will be hereinafter described.

From the hereinabove description it will be readily apparent that when shaft 47 rotates due to the driving action of motor 46, endless cord 21 is driven for imparting rotary movement to pulley 49. The latter in turn imparts rotary movement to rod 25 and tool 27. As stated, the upper end of rod 25, rotating within the hollow lower end of extension 32, does not impart rotary movement to the latter.

When a rotary tool is used in connection with rod 25, pulley 49 is of course keyed thereto. When however tool 27 is disconnected from rod 25, and a saw is connected thereto, and a reciprocating motion is imparted to rod 25, as will be hereinafter described, the mechanism which keys pulley 49 to rod 25 is rendered inoperative for the purpose of permitting said pulley 49 to remain idle on said rod 25. Said mechanism and its connection with pulley 49 will be hereinafter described.

When it is desired to substitute rotary tool 27 by a reciprocating saw, tool 27 is removed from chuck 26, and an oblong bar 50, Figs. 2 and 3, by its cylindrical, reduced extension 51 is inserted within said chuck 26. Said bar 50 is of a square formation on a transverse cross-section. The lower end of said bar 50 is provided on one of its faces with recess 52 within which the upper end of saw 53 is fitted. Clamp member 54 is fitted within recess 52 and over the end of saw 53 and driven toward the reduced body portion of said bar 50, by means of screw 55 for clamping saw 53 to said bar 50.

The lower end of saw 53 is rigidly affixed to the upper end of square rod 56, which is set for an upright reciprocating movement within boss 57 downwardly depending from the front portion of frame 11, and which defines the upper wall of housing 14.

The upper end of said rod 56 is provided with recess 58, Figs. 9 and 10, within which clamping block 59 is receivable. The lower end of said block 59 has screw 60 passed therethrough, for clamping saw 53 when the lower end of which is positioned between the reduced upper end of said rod 56 and said clamping block 59, as is seen in Fig. 9. The recess between the reduced upper end of rod 56 and said clamping block 59, being in a coplanar relation with frame 11, will receive therewithin saw 53 in the same coplanar relation as is seen in Fig. 2. In order to permit the positioning of saw 53 in a plane which is substantially in a perpendicular relation with the plane last hereinabove mentioned, and thereby bring the saw to the position thereof shown in Fig. 3, both said reduced end of rod 56 and clamping block 59 are provided with a continuing slot 61, which remains in a perpendicular relation with the space defined by the said reduced upper end of rod 56 and clamping block 59, as is clearly seen in Fig. 10. In order to maintain saw 53 in rigid association with rod 56 when the lower end thereof has been inserted within slot 61, screw 62 is driven through said clamping block 59 and transversely of slot 61. When said screw 62 is tightened the two leaves in said block 59 effected by said slot 61 will be brought towards each other as well as towards the lower end of saw 53 reposing within said slot 61 for clamping the lower end of saw 53 to said block 59. The continuation of slot 61 into the reduced body portion of the upper end of rod 56 is merely for the purpose of accommodating therewithin a portion of saw 53 extending from clamping block 59.

Bar 50 does not need any special mechanism for accommodating saw 53 in the two right-angled relative positions hereinabove described, because chuck 26 and rod 25 being freely rotatable, permit angular adjustments of the saw shown in Figs. 2 and 3.

The mechanism for reciprocating rod 56, and for imparting thereby a reciprocating motion to saw 53, bar 50, chuck 26, rod 25 and extension 32, includes bar 63, positioned within housing 14, in a longitudinal relation therewith. Its inner end is pivoted upon pin 64 which is driven through frame 11. The outer end of said bar 63 is bifurcated as at 65, for receiving therewithin pin 66 passed through the lower end of rod 56 and extending therefrom in a lateral direction. Collar 67 mounted upon said bar 63 in a longitudinally adjustable relation, supports the upper end of coil spring 68. The lower end of said coil spring 68 is mounted upon pin 69 which projects from base 10. Said spring 68 normally urges bar 63 upwardly.

Means for reciprocating said bar 63 includes shaft 70 passed through and supported by the lower end of frame 11, or more specifically, by the side wall defining said housing 14. The inner end of said shaft 70 has disk 71 rigidly affixed thereto. Said disk 71 has an off-centrically located pin 72, the outer free end of which pivotally connects with the upper end of bar 73, the lower end of which is pivoted to bar 67 by means of pin 74. By virtue of this mechanism, when shaft 70 rotates, it imparts a rotary movement to disk 71, which in turn, through pin 72 imparts an oscillating motion to bar 73. The latter angularly shifts said bar 63, up and down upon pin 64. The bifurcated end 65 of said bar 63, being in a pivotal connection with the lower end of rod 56, through pin 66, imparts a reciprocating motion to said rod 56 and saw 53, as aforesaid.

The outer end of said shaft 70 has keyed thereto a pulley, which is of identical construction as pulley 49, hereinabove mentioned, and for that reason is also marked with numeral 49. Said latter pulley is likewise provided with a mechanism for either keying the same to shaft 70 or for disconnecting the same therefrom and rendering said pulley idle upon said shaft. The occasion for rendering said pulley 49 idle upon said shaft 70 arises when saw 53 has been disconnected from chuck 26 and rod 56 and in lieu thereof rotary tool 27 has been substituted.

Said latter pulley 49 and the other of said pulleys 48 has an endless cord 74 stretched thereover for the purpose of transmitting rotary motion from said last mentioned pulley 48 to said last mentioned pulley 49 and shaft 70, for reciprocating saw 53, as aforesaid.

Boss 57 guides rod 56 in its reciprocating movement. The mechanism for guiding bar 50 in its reciprocating movement includes substantially U-shaped member 75 (Figs. 4 and 5) having laterally projecting wings 76, receiving a plurality of screws 77, by means of which said member 75 is rigidly affixed to the underface of the front portion of the upper end of frame 11. Cooperating with said member 75, and disposed therebelow is supporting plate 78, which is maintained in a spaced relation with the horizontal portion of said U-shaped member 75, by means of spacer 79, interposed between said member 75 and said plate 78, adjacent their rear ends. The horizontal portions of said U-shaped member 75, said plate 78 and spacer 79, are held in a rigid mutual relation by means of screws 80. Receivable within the space defined by the horizontal portion of said U-shaped member 75 and said supporting plate 78 is sliding plate 81, which is adapted for longitudinal sliding movement. Said sliding plate 81 at its opposed edges is provided with a pair of opposed, integrally formed, and downwardly depending tongues 82.

Said tongues 82 contact the margins of said supporting plate 78 and embrace the same, as seen in Fig. 5, and constitute guiding means for said sliding plate 81 during its sliding movement. Centrally, and adjacent the front end thereof, said sliding plate 81 is provided with a longitudinal recess 83, within which threaded bolt 84 is receivable. Said threaded bolt 84 passes through alined apertures made in the horizontal portion of said U-shaped member 75 and said supporting plate 78, which apertures are also in alinement with said recess 83, as seen in Figs. 4 and 5. The lower end of said bolt 84, which extends below said supporting plate 78 is engaged by knob 85, which, in conjunction with the head at the inner end of said bolt 84 constitutes clamping means for the horizontal portion of said U-shaped member 75, supporting plate 78 and sliding plate 81, for the purpose of holding said sliding plate 81 in its adjusted outwardly or inwardly shifted positions.

Adjacent the front end said sliding plate 81 is further provided with enlarged recess 86, with which recess 83 merges, said recess 86 being also in a central relation with said sliding plate 81. Said recess 86 forms in said plate 81 a pair of opposed fingers 87, between which bar 50 is receivable when said sliding plate 81 is shifted outwardly, as is seen in Figs. 2 and 3, for laterally supporting said bar 50, thereby minimizing the vibration of said bar 50 and saw 53, at the upper end of the latter, and on a horizontal plane. One of the sides of said bar 50 contacts with the shoulders resulting from said recesses 83 and 86, transversely of said sliding plate 81, when the latter is fully extended towards said bar 50, as is seen in Fig. 4.

One of said fingers 87 is made longer than the other, and is downwardly bent, for defining hook 88, which may be manually grasped for shifting said sliding plate 81 into its operative or inoperative positions.

Each of pulleys 49 includes the conventional annular member, marked in Figs. 6 and 7 with numeral 49, and provided at its margin with circumferential groove 89, within which cord 21 or 74 is receivable. Integrally formed with the body portion of the pulley and extending from one side thereof is collar 90, which is of a diameter considerably smaller than the diameter of the pulley. The body portion of the pulley and said collar 90 are provided with a continuing bore for receiving therewithin rod 25 or shaft 70, as the case may be. At its base said collar 90 is provided with a substantially semi-annular recess 91, which is in a transverse relation with the body of said collar 90, and of which one side is the side of pulley 49 and the opposite side is the body of said collar 90 resulting from said recess 91. Pivoted upon screw 92, which extends through said collar 90 and engages by its inner end the body portion of pulley 49, is substantially crescent-shaped plate 93. On its inner edge said plate 93 is provided with semi-circular recess 94, within which the periphery of rod 25 or of shaft 70, as the case may be, is receivable when said plate 93 remains in an operative position therewith, as is seen in Fig. 7.

At the edge of said plate 93, adjacent said recess 94, said plate 93 is provided with tooth 95, which extends into key-way 96 made longitudinally on the periphery of said rod 25 or of said shaft 70, as the case may be.

In its operative position, shown in full lines in Fig. 7, said plate 93 contacts the periphery of rod 25 or of shaft 70, as the case may be, with tooth 95 within key-way 96, by virtue of which arrangement pulley 49 and collar 90 are in a rigid locked relation with said rod 25 or with said shaft 70, as the case may be.

Block 97, affixed by screw 98 to the side of pulley 49, contacts the outer periphery of said collar 90, adjacent one end of said recess 91. Affixed to one face of said block 97 by means of screw 99, is leaf spring 100, which bears against one of the side edges of said plate 93, adjacent its pivot point 92.

Adjacent the corner defined by the outer peripheral wall and the opposite side edge, said plate 93 is provided with rigidly affixed knob 101 by means of which said plate 93 may be manually shifted outwardly of recess 91 for bringing said tooth 95 out of key-way 96, into an inoperative position, shown in dotted lines in Fig. 7, for the purpose of disconnecting the pulley from its engagement with rod 25 or with shaft 70, as the case may be.

Along its segment said collar 90 is provided with recess 102, which extends to the adjacent side of pulley 49, and which is at substantially diametrically opposite point of said screw 92. Receivable within said recess 102 is lever 103, which is pivoted to said collar 90 by means of screw 104. Said lever 103 is adapted for angular shifting movement adjacent the outer end of said collar 90. Integrally formed with said lever 103 and downwardly projecting therefrom is extension 105, which normally enters opening 106 made in plate 93, adjacent its free end. The opposite end of said lever, extending outwardly of collar 90 is provided with knob 107, whereby said outer end of lever 103 may be manually depressed for shifting the opposite end thereof and said extension 105 away from pulley 49 and away from plate 93. V-shaped leaf spring 108, set within recess 102, and pivoted at its apex upon screw 109 which is passed through collar 90 and transversely of recess 102, bears by one of its ends against the adjacent face of pulley 49 and by its opposite end against lever 103 adjacent said knob 107.

The purpose of said spring 108 is to maintain the free end of said extension 105 in contact with the adjacent face of pulley 49.

When said plate 93 remains in an operative position shown in full lines in Fig. 7, the free end of said extension 105 remains within opening 106, thereby preventing accidental outward shifting movement of said plate 93 within recess 91. Thus said plate 93 is rigidly engaged by said extension 105 for maintaining said plate 93 in a rigid keyed relation with rod 25 or with shaft 70, as the case may be, thereby maintaining pulley 49 interlocked therewith for imparting rotation thereto either through cord 21 or 74, respectively.

When it is necessary to render one or the other of the two pulleys 49 inoperative, the outer end of lever 103 is downwardly depressed against the tension of spring 108, thereby freeing the end of extension 105 from plate 93 and shifting the same out of opening 106. Said plate 93 being thus freed from its engagement with said extension 105 may then be angularly shifted upon its pivot 92 by grasping at knob 101, and against the tension of spring 100. This shifts plate 93 into its inoperative position until the edge at the free end of plate 93 clears said extension 105. This operation automatically causes extension 105 to spring toward the face of pulley 49, by the action of spring 108, and in the path of plate 93, as seen in Fig. 1 and in dotted lines in Fig. 7, preventing the latter from resuming its operative position. When said plate remains in the inoperative position, with tooth 95 out of key-way 96, pulley 49 remains disconnected from rod 25 or from shaft 70, as the case may be, causing the pulley to remain idle thereon.

It is further observed that when saw 53 is connected in the machine, with pulley 49 on rod 25 made idle, and with pulley 49 on shaft 70 in an operative position, bar 63 is actuated, spring 68 facilitates actuation thereof in an upright direction, while spring 28 assists in shifting saw 53 in the same direction. The off-centric arrangement of disk 71 through pin 72 in engagement with bar 73 actuates said bar in either direction for reciprocating saw 53.

When saw has been disconnected from the machine, and rotary tool 27 substituted therefor, sliding plate 81 is shifted into its inoperative position, and out of the path of tool 27, as is seen in Fig. 1.

Work 37 is of course supported upon any suitable platform, not shown, which may in turn be supported upon base 10.

It is further noted that lower collar 24 provides a support for pulley 49 which is set upon rod 25. Sleeve 16, being adjustable upon post 15 and rigidly affixable thereto by means of screw having handle 17, permits adjustment of rod 25, chuck 26 and tool 27 in a vertical direction to or away from work 37. This adjustment, in cooperation with link 39 and handle bar 40, tends to increase or decrease the tension of spring 28, depending whether said adjustment was made upwardly or downwardly, thereby regulating the degree of pressure required on handle 41 to shift tool 27 downwardly, and the degree of tension in spring 28 for shifting said tool upwardly and away from work 37.

As already noted, when rotary tool 27 is employed in the machine, with handle bar 40 in pivotal connection with extension 32, as seen in Fig. 1, spring 28 has an important function of automatically lifting rod 25 and tool 27 in an upward direction and away from work 37 on release of manual pressure upon handle 41. The function of said spring 28 is equally important when a reciprocating tool is used in the machine. In that latter instance spring 28 shifts rod 25 upwardly, simultaneously shifting thereby the upper end of saw 53 on upward stroke of oscillating bar 63. Obviously, were it not for that function of spring 28, on upward stroke of said bar and the resultant upward shifting movement of rod 56 only the lower end of saw 53 would shift upwardly, causing the saw to bend at some point of its length, because due to the flexible nature of the saw mere longitudinal pressure at one end thereof would be incapable of reciprocating the saw throughout its length. Thus, the function of said spring 28 is common and akin whether the machine is used for operating a rotary tool or is employed for actuating a reciprocating tool. The difference resides merely in the ultimate actions of the two tools with relation to the work.

While there is described herein preferred embodiments of the present invention, it is nevertheless to be understood that minor changes may be made therein without departing from the spirit and scope of the invention as claimed.

What I claim as new is:

1. A tool operating machine comprising an upright C-shaped frame, a substantially hollow boss formed on said frame adjacent the upper end thereof, an elongated shaft mounted in said boss for reciprocating and rotary movement, swiveled abutment means positioned on said shaft adjacent the upper end thereof, a helical spring mounted on said shaft, one end of said helical spring engaging said abutment and the other end thereof engaging said boss, tool supporting means mounted on the other end of said shaft, a first pulley mounted on said shaft, means on said pulley operable to connect said pulley to said shaft for rotation therewith, means for declutching said first pulley from said first shaft, said frame having a vertically extending guideway formed therein adjacent the lower end thereof and spaced from said boss, an elongated member mounted for reciprocation within said guideway, an elongated lever pivotally connected to one end of said elongated member, said lever having the other end thereof pivotally secured to said frame, a link having one of its ends pivotally secured to said elongated lever intermediate the ends thereof, a disc mounted on said frame adjacent said link, means eccentrically connecting the other end of said link with said second disc, a second pulley mounted on said frame in coaxial alignment with said disc and connected thereto for rotation therewith, and tool supporting means mounted on the other end of said elongated member, said first and second tool supporting means being substantially aligned with each other, means mounted on said second pulley operably to effect rotation of said disc, and means for driving said first and second pulleys.

2. A tool operating machine comprising an upright C-shaped frame, a substantially hollow boss formed on said frame adjacent the upper end thereof, an elongated shaft mounted in said boss for reciprocating and rotary movement, swiveled abutment means positioned on said shaft adjacent the upper end thereof, a helical spring mounted on said shaft, one end of said helical spring engaging said abutment and the other end thereof engaging said boss, tool supporting means mounted on the other end of said shaft, a first pulley mounted on said shaft, means on said first pulley operable to connect said first pulley to said shaft for rotation therewith, means for declutching said first pulley from said first shaft, said frame having a vertically extending guideway formed therein adjacent the lower end thereof and spaced from said boss, an elongated member mounted for reciprocation within said guideway, a second pulley mounted on said frame, means connected with one end of said elongated member and said pulley for effecting reciprocation of said elongated member, tool supporting means mounted on the other end of said elongated member, said first and second tool supporting means being substantially aligned with each other, means mounted on said second pulley for rendering said reciprocating means inoperative, and means for driving said first and second pulleys.

JOHN GRZYBOWSKI.

REFERENCES CITED

The following references are of record in the file of this patent:

UNITED STATES PATENTS

| Number | Name | Date |
|---|---|---|
| Re. 23,139 | Langfelder | Aug. 2, 1949 |
| 77,079 | Moyer | Apr. 21, 1868 |
| 101,788 | Tripp | Apr. 12, 1870 |
| 174,105 | Benedict | Feb. 29, 1876 |
| 326,994 | Lafever | Sept. 29, 1885 |
| 444,071 | Laird | Jan. 6, 1891 |
| 695,980 | Wilhelm | Mar. 25, 1902 |
| 787,138 | Wehrlin | Apr. 11, 1905 |
| 807,481 | Miller | Dec. 19, 1905 |
| 1,043,932 | Herrick | Nov. 12, 1912 |
| 1,656,656 | Anderson et al. | Jan. 17, 1928 |
| 2,052,600 | Boss | Sept. 1, 1936 |
| 2,426,028 | Krueger | Aug. 19, 1947 |

FOREIGN PATENTS

| Number | Country | Date |
|---|---|---|
| 45,639 | Sweden | Sept. 13, 1919 |
| 250,379 | Great Britain | Apr. 15, 1926 |
| 384,937 | Great Britain | Dec. 15, 1932 |